United States Patent [19]

Runge et al.

[11] 4,122,637

[45] Oct. 31, 1978

[54] WINDROW RETAINER, AND METHOD OF CONFINING WINDROWS

[75] Inventors: Glen V. Runge, 6738 28th St., Hudsonville, Mich. 49426; Glenn B. Morse, Grand Rapids, Mich.

[73] Assignee: Glen V. Runge, Hudsonville, Mich.

[21] Appl. No.: 789,983

[22] Filed: Apr. 22, 1977

[51] Int. Cl.² ............................................. B62D 63/04
[52] U.S. Cl. ............................................. 52/3; 52/23; 52/741; 52/4
[58] Field of Search ................... 52/2, 3, 4, 5, 23, 741; 61/37, 38; 47/28, 28.1, 31

[56] References Cited

U.S. PATENT DOCUMENTS

| 19,689 | 3/1858 | Dinsmoor | 52/4 |
| 322,045 | 7/1885 | Dean | 52/4 |
| 2,883,676 | 4/1959 | Kwake | 52/3 X |
| 3,862,876 | 1/1975 | Graves | 52/3 X |

FOREIGN PATENT DOCUMENTS

| 187,612 | 1907. | Fed. Rep. of Germany | 52/3 |
| 4,966 of | 1903 | United Kingdom | 52/3 |

*Primary Examiner*—Price C. Faw, Jr.
*Assistant Examiner*—Carl D. Friedman
*Attorney, Agent, or Firm*—Glenn B. Morse

[57] ABSTRACT

A perforate member is laid over a windrow of cut plants to confine it against the action of the wind. The member is open over a major portion of its area to sunlight and the passage of air. The member is held against the ground preferably by the weight of water in flexible tubes extending along opposite sides of the windrow.

2 Claims, 9 Drawing Figures

U.S. Patent  Oct. 31, 1978  Sheet 1 of 2  4,122,637
FIG. 1
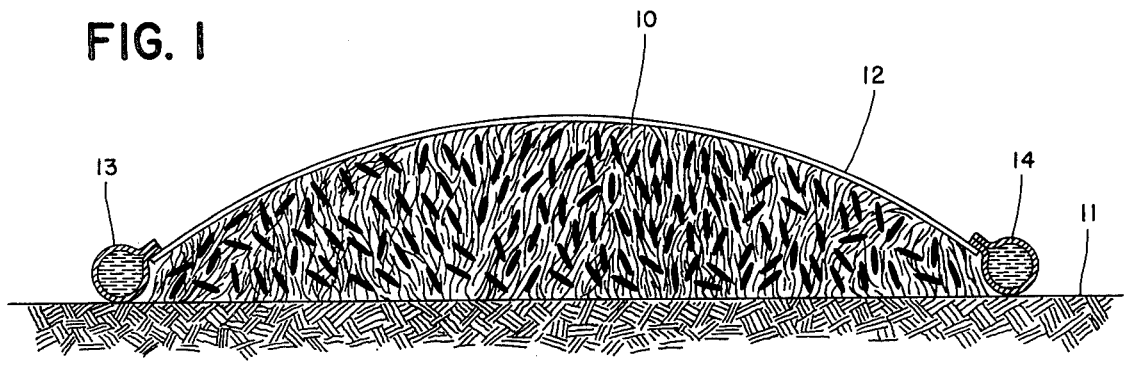
FIG. 2
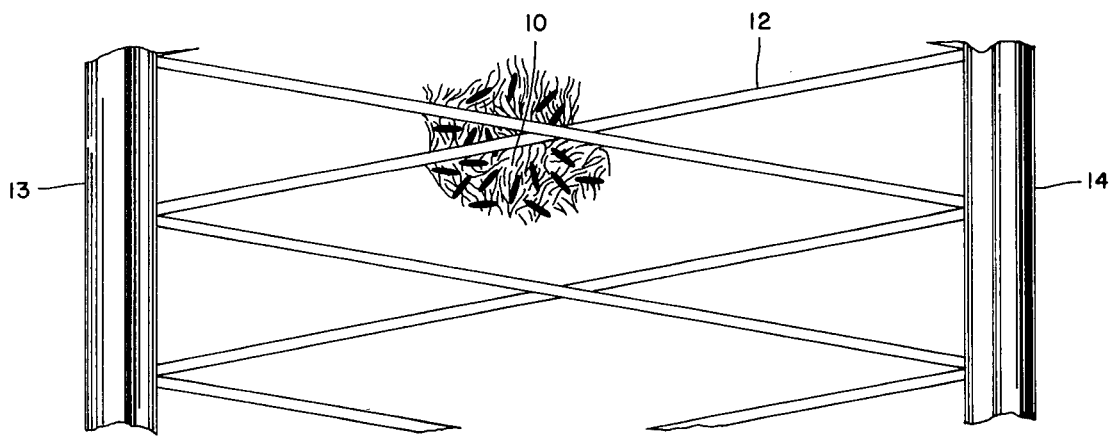
FIG. 3
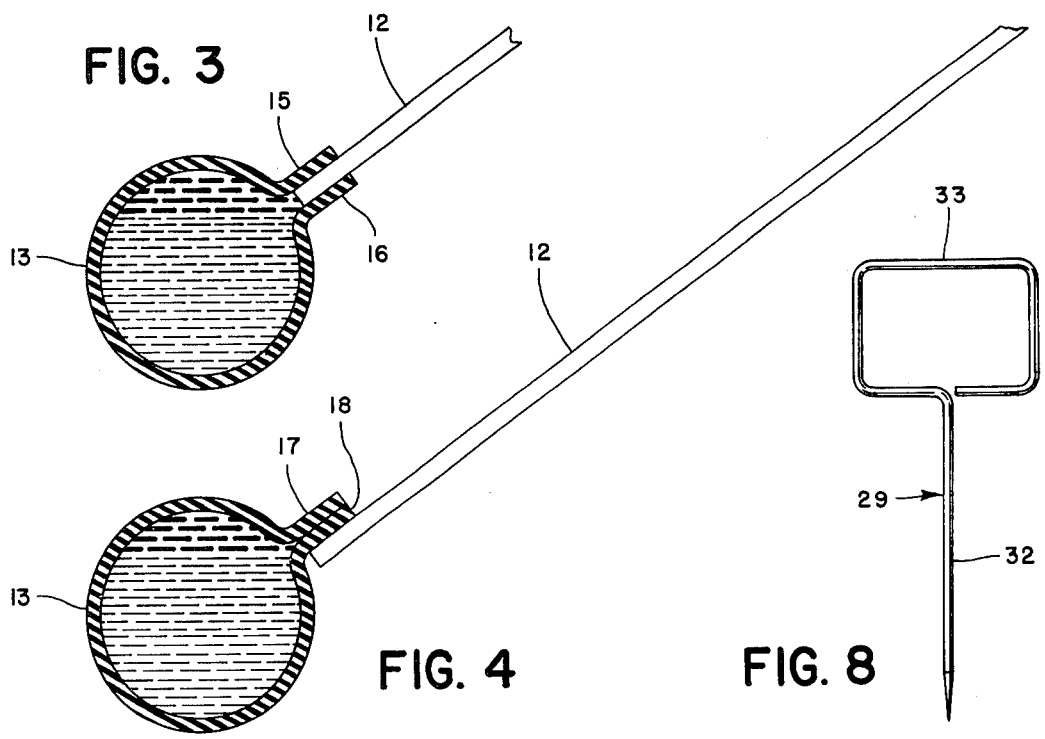
FIG. 4
FIG. 8

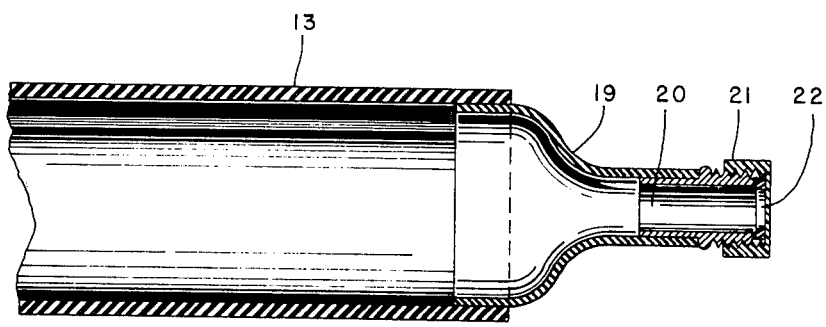
FIG. 5
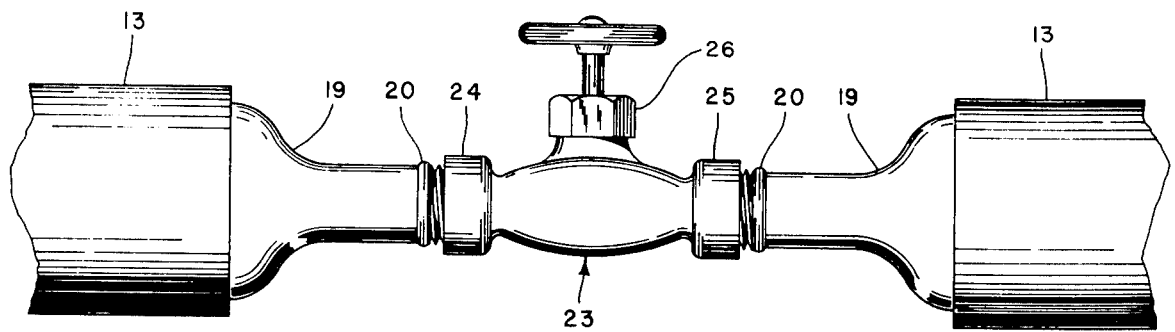
FIG. 6
FIG. 7
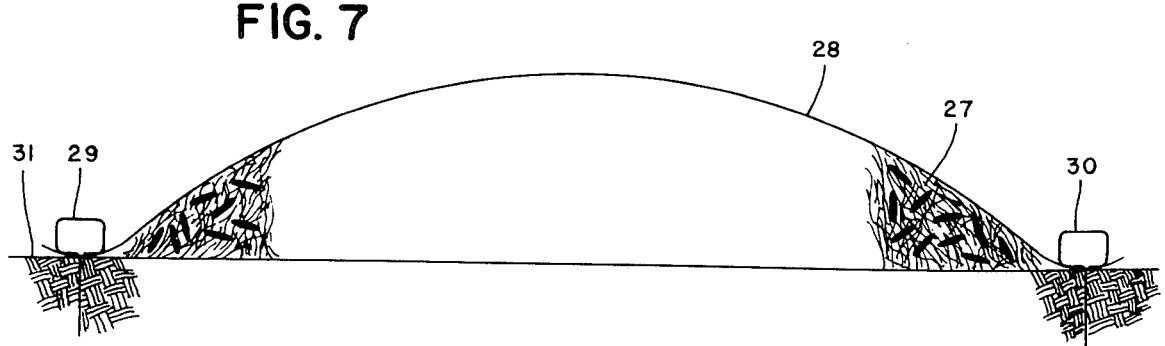
FIG. 9
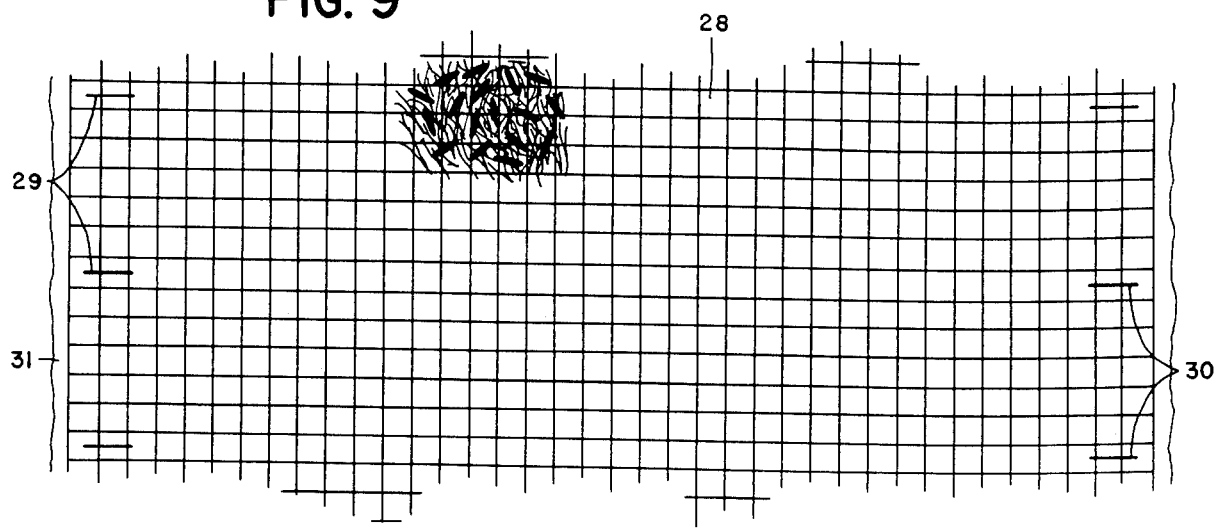

WINDROW RETAINER, AND METHOD OF CONFINING WINDROWS

BACKGROUND OF THE INVENTION

The preparation of beans for harvesting usually involves cutting the mature plants, and raking them into windrows forming a resilient mass of entangled plants a foot or two in depth, and on the order of six feet wide. The plants must be left to dry under the action of the sun and wind long enough for the pods to become sufficiently brittle to permit a threshing operation proceed. These windrows will obviously be spaced by areas of open ground, on which nothing but the plant stubble remains. Most of this type of farming is done in the western plains area, in which the land is flat and subject to extended periods of high wind. While moving air is necessary to the proper drying of the plants, too much of it produces a very serious problem. A high wind occurring near the end of the drying period can easily jostle the plants sufficiently to break open the pods, and induce a partial threshing action dumping the beans on the ground. A more common catastrophe is the bodily transportation of the plants from the windrows to the extent of distributing them generally around the countryside. The loss of crop value in one day or night of such wind has frequently been known to amount to one hundred percent. It is usual to expect at least a twenty percent crop loss to this action every season. Crop losses in one day on one farm from such wind action alone have frequently amounted to between fifty thousand and one hundred thousand dollars.

Attempts have been made to control these wind losses in various ways. One of these has been through the application of sprayed chemicals having a tendency to bind the mat of cut plants together. It is obviously difficult to find spray materials which will be completely non-toxic, as these beans are for human consumption. Any system for confining these windrows must also take into consideration the simple questions of economics. Any system utilizing expensive equipment or large amounts of manual labor are obviously limited in their value. The present invention has been devised as a practical and inexpensive complete solution to this problem.

SUMMARY OF THE INVENTION

An elongated and rollable flexible perforate section is laid over each windrow of cut plants, and is held down against the ground preferably along its marginal edges to hold the plants in place while still providing ventilation and the application of sunlight. In the preferred form of the invention, the perforate section is held in place by the weight of water injected into flexible tubes after the unit is laid in place. These tubes are preferably integral with the perforate section extending laterally across the windrow, so that the entire assembly can be rolled up and unrolled with either a minimum amount of manual labor or by self-propelled carrying vehicles. An alternative form of the invention secures a strip of netting over the plants by stakes forced into the ground along the marginal edges, which can be pulled up by pulling the netting, followed by the manual removal of the stakes from the netting as the netting is rolled up on the retrieving vehicle.

DESCRIPTION OF THE DRAWINGS

FIG. 1 is a schematic sectional view showing a typical installation of the preferred form of the invention over a windrow of cut plants resting on the ground.

FIG. 2. is a plan view with respect to FIG. 1.

FIG. 3 is a fragmentary sectional elevation on an enlarged scale over that of FIGS. 1 and 2, showing the construction of the preferred form of the retaining device along one of its marginal edges.

FIG. 4 illustrates a modified form of the invention with respect to FIG. 3.

FIG. 5 illustrates the construction of the flexible conduit tubes at least at one of its opposite ends.

FIG. 6 illustrates an arrangement for interconnecting secessive sections of the device with a conduit having a shutoff valve.

FIG. 7 is a schematic sectional elevation similar to that of FIG. 1, but illustrating a modified form of the invention involving the securing of netting with stakes.

FIG. 8 is a elevation on an enlarged scale over that of FIG. 7 showing the preferred form of the stakes.

FIG. 9 is a plan view with respect to FIG. 7.

DESCRIPTION OF THE PREFERRED METHOD AND EMBODIMENTS

Referring to FIG. 1, a windrow of cut plants indicated at 10 is shown resting on the ground 11, confined by a grid of parallel or intersecting straps 12 interconnecting the opposite water tubes 13 and 14. This assembly, or grid, constitutes an elongated flexible perforate member that can be handled as a unit. In the preferred form of the invention, this structure including the straps and the opposite water tubes is formed integrally so that the entire assembly (in the absence of water in the tubes) can be rolled up for storage, and unrolled for convenient laying of the assembly over the windrow 10. The injection of water into the tubes 13 and 14 after the assembly has been laid in place applies sufficient weight to retain the plants in the windrow 10 against the wind action. Water is applied to the weight tubes either with the use of a pump having an intake extending to a convenient irrigation ditch, or through the use of a tanker vehicle. The straps 12 can be spaced apart by a considerable distance, and it seems that an appropriate compromise between full confinement of the plants, and providing adequate passage for air and sunlight, is made with a spacing of approximately 12 inches. The water tubes 13 and 14 can be of a flexible material similar to that used in automobile tire tubes, but should be on the order of 3 to 4 inches in diameter to provide appropriate weight when filled with water.

The construction of the device can be affected in a variety of ways. FIG. 3 shows a tube 13 formed by bringing the opposite edges of a strip together at 15 and 16, with a perforate sheet, netting, or individual straps at 12 interposed between the edges 15 and 16, followed by adhesive or welded bonding at this junction. Where straps of substantial thickness are used, it is preferable to use the alternative construction shown in FIG. 4, in which the edges 17 and 18 of the strip forming the tube 13 are brought directly together, followed by the securing of the straps 12 to the outside surface on one side or the other. This arrangement minimizes the possibility of leakage along the seam between the edges forming the tube. As a further alternative, the tube 13 can be extruded as a continuous cross section, followed by the adhesive application of some form of perforate section extending between the tubes.

Referring to FIG. 5, the ends of the tubes 13 and 14 are preferably fitted with a molded flexible end-member 19 forming the beginning of a conduit through which the tubes can be filled. A conventional hose fitting 20 can be secured to the member 19, so that the tube can be closed off by the cap 21 to form a container, with the assistance of the usual washer as shown at 22. Referring to FIG. 6, a sequence of these retaining assemblies can be connected in series by a coupling conduits as shown at 23. The connecting rings 24 and 25 are engagable with the hose fittings 20 in the same manner as is the cap 21. A valve generally indicated at 26 permits the conduit passage to be shut off after the water has been injected, so that leakage in any one of the tubes 13 or 14 will not drain all the water out of the interconnected series.

It should be noted in passing that the integral connection between the tubes and the intervening perforate structure makes it possible to roll the entire assembly at the same time, and is also preferable over merely laying the water tubes over the edges of a netting. Continuing wind action has a tendency to gradually work the netting free from an installation in which the tubes are merely used as weights laid on top of netting in a separate operation.

The modification shown in FIGS. 7, 8, and 9 can be used where the economy of a standard wide-mesh netting is to be used. In protecting the windrow 27 according to this method, the netting 28 is unrolled over the windrow, and then held down by the application of the stakes as shown at 29 and 30 traversing the openings in the mesh or grid of the net 28. This method, as a practical matter, is limited to areas where the ground 31 is sufficiently soft to a depth of a foot or so to permit the insertion of the stakes. The preferred construction of the stakes shown in FIG. 8 is fabricated out of a material such as round steel rod a ¼ inch or so in diameter. The penetrating portion 32 terminates in a handle 33, which is preferably sufficiently broad in the transverse direction so that it will not pull through the mesh of the net 28. After this assembly has performed its function in holding the windrow in place during the curing process, the net 28 can be pulled up manually or by a recovery reel on a convenient form of vehicle, pulling the stakes from the ground by the elevation of the net, with the stakes 29 and 30 being withdrawn manually from the net as the net is pulled free of the windrow.

We claim:

1. A windrow retainer, comprising
a plurality of elongated rollable flexible members each having an axially central portion formed at least by spaced transverse strands; and
flexible tubes extending along the lateral margins of each of said members and integral therewith, said tubes forming fillable and drainable containers of liquid; and
conduit means interconnecting said members in sequence, said conduit means incuding a valve.

2. A method of confining a windrow of plants, comprising:
laying a plurality of elongated flexible members lengthwise over said windrow, said members each having a plurality of spaced strands extending transversely of the length thereof, said members being open to the passage of air and sunlight over a major portion of the area thereof; holding said member with respect to the ground by adding water to containers integral with opposite sides of said members; and
interconnecting said members in axial sequence along said windrow with conduit means including valve means; and
blocking said conduit means after the placement of water in said containers.

* * * * *